United States Patent [19]
Yoshida
[11] Patent Number: 4,734,132
[45] Date of Patent: Mar. 29, 1988

[54] LIPOPHOBICATING SOLUTION FOR ELECTROPHOTOGRAPHIC PLATES FOR OFFSET PRINTING CONTAINS PHYTIC ACID AND AT LEAST TWO DICARBOXYLIC ACIDS

[75] Inventor: Hajime Yoshida, Nagoya, Japan

[73] Assignee: Nikken Chemical Laboratory Co., Ltd., Nagoya, Japan

[21] Appl. No.: 905,261

[22] Filed: Sep. 9, 1986

[30] Foreign Application Priority Data

Oct. 1, 1985 [JP] Japan ................................ 60-218962

[51] Int. Cl.$^4$ ......................... B41M 5/00; C09D 5/20

[52] U.S. Cl. ......................................... 106/2; 252/136; 252/146; 252/356; 430/104

[58] Field of Search ............................. 430/104; 106/2; 252/356

[56] References Cited

U.S. PATENT DOCUMENTS

| | | | |
|---|---|---|---|
| 3,592,640 | 7/1971 | Van Engeland | 430/49 |
| 4,475,460 | 10/1984 | Matsumoto | 106/2 X |
| 4,579,591 | 1/1986 | Suzuki et al. | 106/2 |

FOREIGN PATENT DOCUMENTS

| | | |
|---|---|---|
| 57-20394 | 2/1982 | Japan . |
| 59-35994 | 2/1984 | Japan . |

*Primary Examiner*—J. David Welsh
*Attorney, Agent, or Firm*—Spencer & Frank

[57] ABSTRACT

There is provided a lipophobicating solution for electrophotographic plates for offset printing which comprises (a) phytic acid, (b) two or more dicarboxylic acids selected from those represented by the formula $HOOC-(CH_2)_n-COOH$ (where n is 1 to 6) and phthalic acid, (c) water, and (d) a pH adjustor. This lipophobicating solution does not cause scumming and its effect lasts for a long period of time.

18 Claims, 2 Drawing Figures

Note: The total amount of phthalic acid and adipic acid was kept constant.

Mixing ratio of phytic acid to malonic acid and adipic acid

Note : The mixing ratio of malonic acid to adipic acid was kept constant.

LIPOPHOBICATING SOLUTION FOR ELECTROPHOTOGRAPHIC PLATES FOR OFFSET PRINTING CONTAINS PHYTIC ACID AND AT LEAST TWO DICARBOXYLIC ACIDS

BACKGROUND OF THE INVENTION

1. Field of the Invention

The present invention relates to a lipophobicating solution for electrophotographic plates for offset printing. More particularly, it relates to an improvement of a lipophobicating solution containing phytic acid as the chelating agent. This lipophobicating solution is applied to a plate material (referred to as master paper hereinafter) produced by coating the surface of a support (e.g., paper) with zinc oxide to form the lipophilic image areas by electrophotography on a plate for offset printing.

2. Description of the Prior Art

Among the lipophobicating solutions for electrophotographic plates for offset printing, the one based on phytic acid is being proposed in place of the one based on ferrocyan ion because the former causes no harm, permits the use of cyanin blue-based ink, and facilitates pH adjustment. However, it is known that a lipophobicating solution prepared simply by diluting phytic acid is not of practical value because it soon causes scumming to master paper (as shown in Comparative Experiment 1 given later). To eliminate this disadvantage, there have been proposed some practical lipophobicating solutions. An example is composed of phytic acid, a complex or salt of an aminocarboxylic acid, and a polyhydroxy-carboxylic acid (as shown in Conventional Example 1 given later). The other example is composed of a metal salt of phytic acid, a water-soluble fluoride, an alkali metal salt of dicarboxylic acid, and an alkali metal salt of phosphoric acid (as shown in Conventional Example 2 give later). It is said that these lipophobicating solutions provide master paper capable of thousands to ten thousands impressions without scumming.

The present inventors prepared lipophobicating solutions according to the formulations given in Conventional Examples and examined them for their effect. It was found that the master paper treated with them causes slight scumming even at the beginning of printing (as shown in Table 1 given later). These results suggest that the conventional lipophobicating solutions have a disadvantage in practical use.

SUMMARY OF THE INVENTION

The gist of the present invention resides in a lipophobicating solution for electrophotographic plates for offset printing which contains phytic acid as a chelating agent and two or more dicarboxylic acids selected from $HOOC—(CH_2)_n—COOH$ (where n is 1 to 6) and phthalic acid.

It is the first object of the present invention to provide a lipophobicating solution of practical use which does not cause scumming at all although it contains phytic acid as in the conventional lipophobicating solution containing phytic acid as a chelating agent.

It is the second object of the present invention to provide a lipophobicating solution which affords durable master paper capable of printing without any scumming (for consecutive 30 days, 3000 impressions every day).

It is the third object of the present invention to provide a lipophobicating solution containing dicarboxylic acids as a subsidiary material which is inexpensive and readily available.

It is the fourth object of the present invention to provide a lipophobicating solution which can be easily prepared from phytic acid and two or more dicarboxylic acids in a broad mixing ratio.

DETAILED DESCRIPTION OF THE INVENTION

Figure 1:
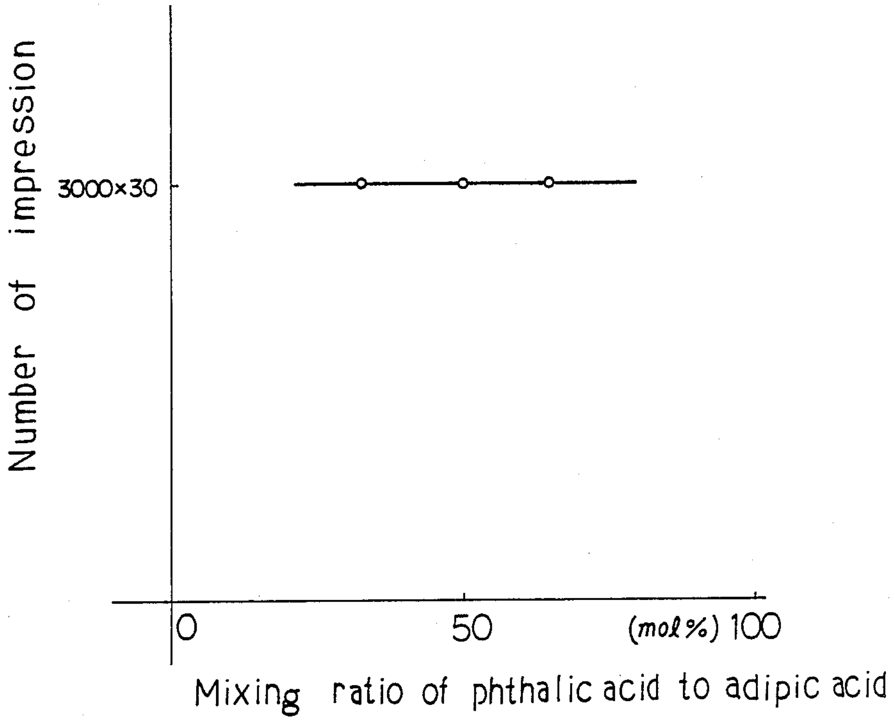
FIG. 1 is a graph showing the relationship between the mixing ratio (mol%) of phthalic acid to adipic acid and the number of impressions.

The following are detailed descriptions of the constituents of the lipophobicating solution of this invention.

(a) Phytic acid (also called inositol hexaphosphate) makes the nonimage areas lipophobic, preventing the sticking of oily ink, on account of its hydroxyl groups at the 2- and 6-positions or at the 3- and 5-positions that form a chelate compound with zinc on the nonimage areas formed on master paper by electrophotography. Phytic acid occurs in nature in the seeds of many cereal grains, and it is harmless to human bodies.

(b) Dicarboxylic acid is an auxiliary for phytic acid. It includes, for example, malonic acid, succinic acid, glutaric acid, adipic acid, pimelic acid, cork acid, and phthalic acid. Two or more dicarboxylic acids are selected from them. Those dicarboxylic acids in which n=7 or up for the $(CH_2)_n$ group are not satisfactory in water solubility. Oxalic acid (in which n=0) is not effective in this invention. Phthalic acid may be added in the form of anhydride. Isophthalic acid and terephthalic acid are not desirable because they react with phytic acid to form precipitates.

The dicarboxylic acid should be added in an amount of about 60 to 100% (by mol) for phytic acid (anhydrous). See FIG. 2. With dicarboxylic acid less than 60%, the lipophobicating solution is poor in durability; and dicarboxylic acid in excess of 100% does not produce any more improvement in durability.

Phytic acid used in combination with two or more of the above-mentioned dicarboxylic acids produces the desired effect through the mechanism which is presumed as follows:

(i) The dicarboxylic acids (excluding terephthalic acid, isophthalic acid, and oxalic acid) also form chelate compounds with zinc.

(ii) The two or more dicarboxylic acids produce the buffer action and continue forming chelating compounds even when the lipophobicating solution changes in properties such as concentration and pH.

(c) The lipophobicating solution of this invention may contain the following additives according to need.

Pastes such as starch (including soluble starch and dextrin) and derivatives thereof, cellulose derivatives, sodium polyacrylate, gum arabic, and pullulan which are in common use.

Wetting agents such as ethylene glycol, propylene glycol, diethylene glycol, polyethylene glycol, polypropylene glycol, glycerin, sorbitol, glucose, and sugar.

Inorganic acids and salts thereof such as phosphoric acid, metaphoshoric acid, nitric acid, silicic acid, and metasilicic acid, and organic acids and salts thereof such as citric acid and tannic acid which are commonly used for printing chemicals.

Preservatives such as salicyclic acid, benzoic acid, and dehydroacetic acid.

Auxiliaries such as benzene, toluene, and aromatic sulfonic acid and salts thereof.

Interfacial tension adjusting agents such as lower alcohols, ethers, ketones, and cellosolves.

Coloring dyes.

EXAMPLES

The examples of the invention are explained in the following.

Different kinds of lipophobicating solutions were prepared from 1000 parts by weight of water, 150 parts by weight of 50% phytic acid, and a prescribed amount of dicarboxylic acid as shown in Table 1. The resulting solution was adjusted to pH 4. (Phytic acid is a product of Mitsui Toatsu Chemicals, Inc.)

Each of the lipophobicating solutions was applied to master paper which had undergone platemaking. On the other hand, the lipophobicating solution was diluted 10 times with water, and the diluted solution was used as a dampening solution.

The performance of the lipophobicating solutions was evaluated by actual printing with an offset printing machine (Besty 1800 CD, made by Toko Co., Ltd. and 2800 CD made by Ryobi Co., Ltd.), deep blue ink ("Master blue" made by Nikken Kagaku Kenkyusho), and neutral paper (with 20% ash, made by Hokuetsu Paper Mills, Ltd.).

Lipophobicating solutions in Comparative Experiments and Conventional Examples were prepared according to the following formulations.

COMPARATIVE EXPERIMENT 1

Water: 1000 parts by weight
Phytic acid (50%): 150 parts by weight

COMPARATIVE EXPERIMENT 2

Water: 1000 parts by weight
Phytic acid (50%): 150 parts by weight
Adipic acid: 26 parts by weight

COMPARATIVE EXPERIMENT 3

Water: 1000 parts by weight
Phytic acid (50%): 150 parts by weight
Phthalic acid: 26 parts by weight

CONVENTIONAL EXAMPLE 1

$[Ni(NH_2CH_2COO)_2].H_2O_2$: 25 parts by weight
Gluconic acid: 60 parts by weight
Water: 855 parts by weight
Phytic acid (50%): 120 parts by weight
adjusted to pH 5 with sodium phosphate

CONVENTIONAL EXAMPLE 2

Sodium succinate: 30 parts by weight
Sodium malonate: 30 parts by weight
Sodium fluoride: 10 parts by weight
Sodium polyacrylate: 10 parts by weight
Water: 700 parts by weight
Phytate ester magnesium: 100 parts by weight
adjusted to pH 4.4 with sodium phosphate The phytic acid used Comparative Experiments is the same as the one used in Examples.

In both Examples and Comparative Experiments, each master paper was used for printing of 3000 impressions, and the resulting printed paper was visually examined for scumming in the nonimage areas. The printing of 3000 impressions was performed once a day for consecutive 30 days, during which the lipophobicating solution was left in the working place under the normal conditions until next day, so that the experiments were carried out under the actual printing conditions. The results are shown in Table 1.

It is noted from Table 1 that the lipophobicating solutions in Examples did not cause scumming even after printing of 3000×30 impressions.

FIG. 1 is a graph showing the relationship between the mixing ratio (mol%) of phthalic acid to adipic acid and the number of impressions. The total amount of phthalic acid and adipic acid was kept constant (about 0.156 mol and 26 parts by weight). This result suggests that the mixing ratio of the dicarboxylic acids is not critical.

Figure 2:
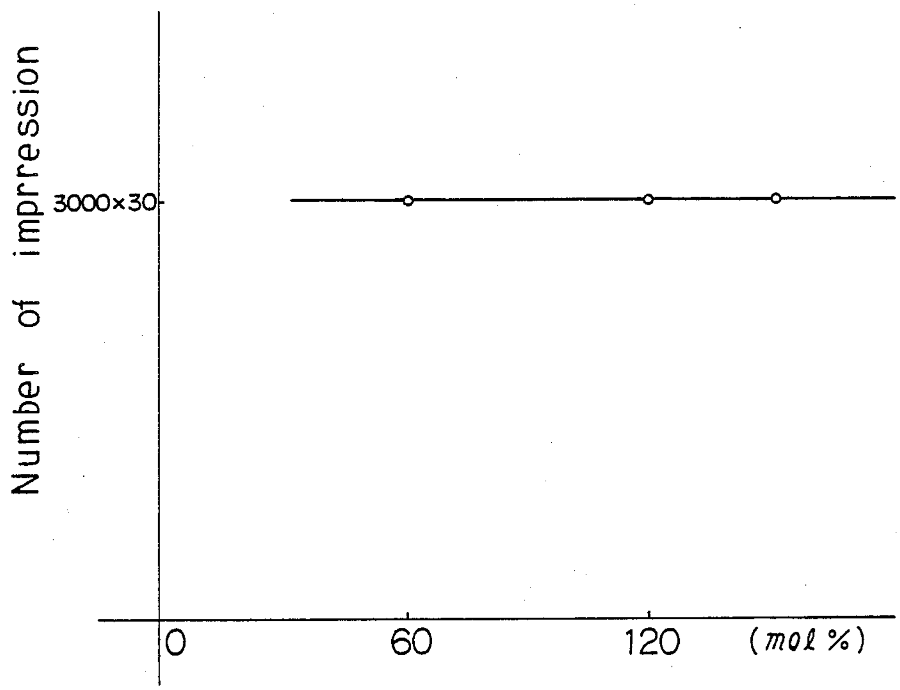
FIG. 2 is a graph showing the relationship between the mixing ratio of phytic acid to malonic acid and adipic acid (0.8:1 by mol) and the number of impressions.

FIG. 2 is a graph showing the relationship between the mixing ratio of the total amount of malonic acid and adipic acid (0.8:1 in mole=1:2 in parts by weight) and the number of impressions. It is noted from FIG. 1 and FIG. 2 that the amount of dicarboxylic acids should be more than 0.067 mol (or more than 60 mol%) for phytic acid (150 g of 50% phytic acid=0.113 mol).

The results shown in FIG. 1 and 2 were obtained by experiments in which the lipophobicating solution was prepared from 1000 parts by weight of water, 150 parts by weight of phytic acid, and a prescribed amount of dicarboxylic acid. In the experiments that gave the results in FIGS. 1 and 2, no scumming occurred after printing of 3000×30 impressions.

It is expected that the same results as in Examples will be obtained even in the case where the dicarboxylic acids are replaced by others and three or more dicarboxylic acids are used.

TABLE 1

| Example | Dicarboxylic acid | (parts by weight) | Results |
|---|---|---|---|
| 1 | Malonic acid | 13 | No scumming after |
| | Succinic acid | 13 | 3000 × 30 impressions |
| 2 | Glutaric acid | 13 | No scumming after |
| | Adipic acid | 13 | 3000 × 30 impressions |
| 3 | Malonic acid | 9 | No scumming after |
| | Adipic acid | 17 | 3000 × 30 impressions |
| 4 | Malonic acid | 20 | No scumming after |
| | Cork acid | 6 | 3000 × 30 impressions |
| 5 | Succinic acid | 20 | No scumming after |
| | Pimelic acid | 6 | 3000 × 30 impressions |
| 6 | Phthalic acid | 13 | No scumming after |
| | Malonic acid | 13 | 3000 × 30 impressions |
| 7 | Phthalic acid | 13 | No scumming after |
| | Adipic acid | 13 | 3000 × impresssions |
| 8 | Phthalic acid | 20 | No scumming after |
| | Cork acid | 6 | 3000 × 30 impressions |
| 9 | Phthalic acid | 7 | No scumming after |
| | Malonic acid | 7 | 3000 × 30 impressions |
| | Adipic acid | 7 | |
| 10 | Malonic acid | 9 | No scumming after |
| | Adipic acid | 9 | 3000 × 30 impressions |
| | Cork acid | 9 | |
| 1* | Phytic acid only | — | Scumming occurred at the beginning |
| 2* | Adipic acid | 26 | Slight scumming occurred at the beginning |
| 3* | Phthalic acid | 26 | Slight scumming occurred at the beginning |
| 1** | | | Slight scumming occurred at the beginning |

TABLE 1-continued

| Example | Dicarboxylic acid | (parts by weight) | Results |
|---|---|---|---|
| 2** | | | Slight scumming occurred at the beginning |

*Comparative Experiment
**Conventional Example
Note: In both Examples and Comparative Experiments, the lipophobicating solution was prepared from 1000 parts by weight of water, 150 parts of 50% phytic acid, and a prescribed amount (indicated above) of dicarboxylic acids. The solution was adjusted to approximately pH 4.0.

In examples shown in Table 2, the lipophobicating solutions contain some chemicals in addition to phytic acid and dicarboxylic acids. As in the above-mentioned examples, they did not cause scumming even after printing of 3000×30 impressions.

TABLE 2

| | Example No. | | | | | | | | | | | | | |
|---|---|---|---|---|---|---|---|---|---|---|---|---|---|---|
| Components | 11 | 12 | 13 | 14 | 15 | 16 | 17 | 18 | 19 | 20 | 21 | 22 | 23 | 24 |
| Water | 500 | 500 | 500 | 500 | 500 | 500 | 500 | 500 | 500 | 500 | 500 | 500 | 500 | 500 |
| Phytic acid (50%) | 60 | 60 | 60 | 60 | 60 | 60 | 60 | 60 | 60 | 60 | 60 | 60 | 60 | 60 |
| Malonic acid | 5 | 5 | 5 | 5 | 5 | 5 | 5 | 5 | 5 | 5 | 5 | 5 | 5 | 5 |
| Adipic acid | 10 | 10 | 10 | 10 | 10 | 10 | 10 | 10 | 10 | 10 | 10 | 10 | 10 | 10 |
| NaOH (flake) | 16.2 | 16.2 | 16.2 | 16.2 | 16.2 | 16.2 | 16.2 | 16.2 | 16.2 | 16.2 | 16.2 | 16.2 | 16.2 | 16.2 |
| Na Benzoate | 0.5 | 0 | 0 | 0 | 0.5 | 0.5 | 0.5 | 0 | 0 | 0 | 0.5 | 0.5 | 0 | 0.5 |
| Na di-hydroxy-acetate | 0.2 | 0 | 0 | 0 | 0.2 | 0.2 | 0.2 | 0 | 0 | 0 | 0.2 | 0.2 | 0 | 0.2 |
| Butyl carbitol | 0 | 5 | 0 | 0 | 5 | 0 | 0 | 5 | 5 | 0 | 5 | 5 | 5 | 5 |
| Pullulan | 0 | 0 | 20 | 0 | 0 | 20 | 0 | 20 | 0 | 20 | 20 | 0 | 20 | 20 |
| Na p-toluene-sulfonate | 0 | 0 | 0 | 24 | 0 | 0 | 24 | 0 | 24 | 24 | 0 | 24 | 24 | 24 |

Quantities are in parts by weight.
NaOH is a pH adjustor.
Na benzoate and Na dihydroxyacetate are preservatives.
Butyl carbitol (DEG monobutyl ether) is a surface tension depressant to improve wettability.
Pullulan is a paste.
Na p-toluenesulfonate is a common auxiliary for the lipophobicating solution containing phytic acid as a chelating agent.

What is claimed is:

1. A lipophobicating solution for an electrophotographic plate for offset printing, comprising:
(a) an effective amount of phytic acid to prevent oily ink from sticking to nonimage areas of said electrographic plate;
(c) at least about 60 mol % by weight, compared to said phytic acid, of a mixture of two or more dicarboxylic acids selected from those represented by the formula HOOC—$(CH_2)_n$—COOH (where n is 1 to 6) and phthalic acid;
(c) water; and
(d) a basic salt as a pH adjustor.

2. A lipophobicating solution for electrophotographic plates for offset printing as set forth in claim 1, wherein the pH adjustor is a sodium salt.

3. A lipophobicating solution for electrophotographic plates for offset printing as set forth in claim 1, which further comprises a preservative selected from the group consisting of salicyclic acid, benzoic acid, and dehydroacetic acid.

4. A lipophobicating solution for electrophotographic plates for offset printing as set forth in claim 1, which further comprises a surface tension depressant selected from the group consisting of lower alcohols, ethers, ketones, and cellosolves.

5. A lipophobicating solution for electrophotographic plates for offset printing as set forth in claim 1, which further comprises a paste selected from the group consisting of starch, starch derivatives, cellulose derivatives, sodium polyacrylate, gum arabic, and pullulan.

6. A lipophobicating solution for electrophotographic plates for offset printing as set forth in claim 1, which further comprises an auxiliary agent selected from the group consisting of benzene, toluene, and aromatic sulfonic acid and salts thereof.

7. A lipophobicating solution for electrophotographic plates for offset printing as set forth in claim 3, which further comprises a surface tension depressant selected from the group consisting of lower alcohols, ethers, ketones, and cellosolves.

8. A lipophobicating solution for electrophotographic plates for offset printing as set forth in claim 3, which further comprises a paste selected from the group consisting of starch, starch derivatives, cellulose derivatives, sodium polyacrylate, gum arabic, and pullulan.

9. A lipophobicating solution for electrophotographic plates for offset printing as set forth in claim 3, which further comprises an auxiliary agent selected from the group consisting of benzene, toluene, and aromatic sulfonic acid and salts thereof.

10. A lipophobicating solution for electrophotographic plates for offset printing as set forth in claim 4, which further comprises a paste selected from the group consisting of starch, starch derivatives, cellulose derivatives, sodium polyacrylate, gum arabic, and pullulan.

11. A lipophobicating solution for electrophotographic plates for offset printing as set forth in claim 4, which further comprises an auxiliary agent selected from the group consisting of benzene, toluene, and aromatic sulfonic acid and salts thereof.

12. A lipophobicating solution for electrophotographic plates for offset printing as set forth in claim 5, which further comprises an auxiliary agent selected from the group consisting of benzene, toluene, and aromatic sulfonic acid and salts thereof.

13. A lipophobicating solution for electrophotographic plates for offset printing as set forth in claim 7, which further comprises a paste selected from the group consisting of starch, starch derivatives, cellulose derivatives, sodium polyacrylate, gum arabic, and pullulan.

14. A lipophobicating solution for electrophotographic plates for offset printing as set forth in claim 7, which further comprises an auxiliary agent selected from the group consisting of benzene, toluene, and aromatic sulfonic acid and salts thereof.

15. A lipophobicating solution for electrophotographic plates for offset printing as set forth in claim 10, which further comprises an auxiliary agent selected from the group consisting of benzene, toluene, and aromatic sulfonic acid and salts thereof.

16. A lipophobicating solution for electrophotographic plates for offset printing as set forth in claim 13, which further comprises an auxiliary agent selected from the group consisting of benzene, toluene, and aromatic sulfonic acid and salts thereof.

17. A lipophobicating solution for electrophotographic plates for offset printing as set forth in claim 1, including about 100 mol % by weight, compared to said phytic acid, of a mixture of two or more dicarboxylic acids.

18. A lipophobicating solution for an electrophotographic plate for offset printing, consisting essentially of:

(a) an effective amount of phytic acid to prevent oily ink from sticking to nonimage areas of said electrographic plate;

(b) at least about 60 mol % by weight, compared to said phytic acid, of a mixture of two or more dicarboxylic acids selected from those represented by the formula $HOOC-(CH_2)_n-COOH$ (where n is 1 to 6) and phthalic acid;

(c) water; and (d) a basic salt as a pH adjuster.

* * * * *